US010342036B2

(12) United States Patent
Sebire

(10) Patent No.: US 10,342,036 B2
(45) Date of Patent: Jul. 2, 2019

(54) SECONDARY SCHEDULING REQUEST

(71) Applicant: Nokia Solutions and Networks Oy, Espoo (FI)

(72) Inventor: Benoist Pierre Sebire, Tokyo (JP)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/546,408

(22) PCT Filed: Jan. 29, 2015

(86) PCT No.: PCT/EP2015/051804
§ 371 (c)(1),
(2) Date: Jul. 26, 2017

(87) PCT Pub. No.: WO2016/119851
PCT Pub. Date: Aug. 4, 2016

(65) Prior Publication Data
US 2017/0367115 A1    Dec. 21, 2017

(51) Int. Cl.
*H04W 72/12*    (2009.01)
*H04L 5/00*    (2006.01)
(Continued)

(52) U.S. Cl.
CPC ......... *H04W 72/1284* (2013.01); *H04L 5/001* (2013.01); *H04L 5/003* (2013.01);
(Continued)

(58) Field of Classification Search
CPC ......... H04W 72/1284; H04W 74/0833; H04W 72/14; H04L 5/001; H04L 5/0094; H04L 5/003; H04L 5/0098
See application file for complete search history.

(56) References Cited

U.S. PATENT DOCUMENTS

2016/0366681 A1* 12/2016 Dinan .................. H04L 5/00

FOREIGN PATENT DOCUMENTS

EP    2 557 878 A1    2/2013
JP    2014110451 A    6/2014
(Continued)

OTHER PUBLICATIONS

3GPP WG1 #75 (Discussion on PUCCH transmission for TDD-FDD CA, R1-135628).*

(Continued)

*Primary Examiner* — Lakeram Jangbahadur
(74) *Attorney, Agent, or Firm* — Squire Patton Boggs (US) LLP

(57) ABSTRACT

The present invention addresses method, apparatus and computer program product for handling of secondary scheduling request in carrier aggregation. Thereby, a message comprising a request of radio resources for uplink transmission from the user equipment to a base station is composed, it is determined whether the user equipment is in a carrier aggregation mode in which two or more carriers are aggregated forming one primary cell and at least one secondary cell, the primary cell and at least one secondary cell supporting physical uplink control channel, the message is assigned to a physical uplink control channel, wherein assigning is permitted to the physical uplink control channel of the primary cell and a physical uplink control channel of any of the at least one secondary cell, and transmission of the message is caused using the assigned physical uplink control channel.

20 Claims, 5 Drawing Sheets

(51) Int. Cl.
*H04W 72/14* (2009.01)
*H04W 74/08* (2009.01)

(52) U.S. Cl.
CPC .......... *H04L 5/0094* (2013.01); *H04W 72/14* (2013.01); *H04W 74/0833* (2013.01); *H04L 5/0098* (2013.01)

(56) References Cited

FOREIGN PATENT DOCUMENTS

| WO | 2012136269 A1 | 10/2012 |
| WO | 2012/146305 A1 | 11/2012 |
| WO | 2013/168917 A1 | 11/2013 |
| WO | 2016/121731 A1 | 8/2016 |

OTHER PUBLICATIONS

3GPP WG1 #78 (Support of PUCCH on Scell, R1-143307).*

International Search Report and Written Opinion received for corresponding Patent Cooperation Treaty Application No. PCT/EP2015/051804, dated Sep. 10, 2015, 15 pages.

CMCC: Discussion on PUCCH transmission for TDD-FDD CA\3GPP Draft; RI-135628, 3rd Generation Partnership Project (3GPP), Mobile Competence Centre ; 650, Route Des Lucioles ; F-06921 S0phia-Ant1polis Cedex ; France vol. RAN WG1, No. San Francisco, USA; Nov. 11, 2013-Nov. 15, 2013 Nov. 13, 2013 (Nov. 13, 2013), XP050735285.

Ericsson: "Support of PUCCH on SCell", 3GPP Draft; RI-143307, 3rd Generation Partnership Project (3GPP), Mobile Competence Centre; 650, Route Des Lucioles; F-06921 Sophia-Antipolis Cedex; France vol. RAN WG1, No. Dresden, Germany; Aug. 18, 2014-Aug. 22, 2014 Aug. 17, 2014 (Aug. 17, 2014), XP050788780.

Nokia Corporation et al: "New WI proposal: LTE Carrier Aggregation Enhancement Beyond 5 Carriers", 3GPP Draft; RP-142286, 3rd Generation Partnership Project (3GPP), Mobile Competence Centre; 650, Route Des Lucioles; F-06921 Sophia-Antipolis Cedex; France vol. TSG RAN, No. Maui; Dec. 8, 2014-Dec. 11, 2014 Dec. 11, 2014 (Dec. 11, 2014), XP050900256.

NTT Docomo: "Design of TDD-FDD Carrier Aggregation for LTE Rel.12", 3GPP Draft; RI-134495, 3rd Generation Partnership Project (3GPP), Mobile Competence Centre; 650, Route Des Lucioles; F-06921 Sophia-Antipolis Cedex; France vol. RAN WG1, No. Guangzhou, China; Oct. 7, 2013-Oct. 11, 2013 Sep. 28, 2013 (Sep. 28, 2013), XP050717597.

Mediatek Inc: PUCCH transmission on Scell for TDD-FDD CA\3GPP Draft; RI-135429 PUCCH Transmission on Scell for TDD-FDD CA, 3rd Generation Partnership Project (3GPP), Mobile Competence Centre ; 650, Route Des Lucioles ; F-06921 Sophia-Antipolis Cedex ; Franc vol. RAN WG1, No. San Francisco, US; Nov. 11, 2013-Nov. 15, 2013 Nov. 13, 2013 (Nov. 13, 2013), XP050735104.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.3.0, Sep. 2014, pp. 1-57.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.3.0, Sep. 2014, pp. 1-215.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.3.0, Sep. 2014, pp. 1-378.

Office action received for corresponding European Patent Application No. 15701545.4, dated May 30, 2018, 8 pages.

Japanese Office Action corresponding to Appln. No. 2017-539424, dated Jul. 4, 2018.

Office action received for corresponding Japanese Patent Application No. 2017-539424, dated Jul. 10, 2018, 4 pages of office action and 5 pages of translation available.

European Office Action corresponding to Appln. No. 15701545.4, dated Oct. 10, 2018.

Japanese Office Action, with English language summary, corresponding to Appln. No. 2017-539424, dated Mar. 5, 2019.

European Office Action corresponding to Appln. No. 15 701 545.4, dated Apr. 29, 2019.

* cited by examiner

Fig. 4 receiving a message comprising a request of radio resources for uplink transmission from a user equipment to the base station — S41

SECONDARY SCHEDULING REQUEST

RELATED APPLICATION

This application was originally filed as Patent Cooperation Treaty Application No. PCT/EP2015/051804 filed Jan. 29, 2015.

FIELD OF THE INVENTION

The present invention generally relates to communication networks, and more specifically relates to methods, apparatuses and computer program products for handling of secondary scheduling request in carrier aggregation.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

In general, a communication device, such as a so called user equipment UE, may communicate with more than one cell. Communications with more than one cell may be provided so as to increase performance. Such provision may be ensured e.g. based on carrier aggregation CA. In carrier aggregation a plurality of carriers are aggregated to increase bandwidth. Carrier aggregation comprises aggregating a plurality of component carriers.

LTE-Advanced LTE-A is an example of a system capable of providing carrier aggregation. In LTE-A, two or more component carriers CCs can be aggregated in order to support wider transmission bandwidths and/or for spectrum aggregation. Thereby, LTE-Advanced aims to support peak data rates of e.g. 1 Gbps in the downlink and 500 Mbps in the uplink. In order to fulfill such requirements, a transmission bandwidth of up to 100 MHz is required. Since the availability of such large portions of contiguous spectrum is rare in practice, LTE-A utilizes carrier aggregation of multiple CCs to achieve high bandwidth transmission. In doing so, LTE-A supports aggregation of up to five 20 MHz CCs.

Release 10 (i.e. 3GPP TS 36.300) of the E-UTRA specifications introduced Carrier Aggregation CA, where two or more component carriers CCs are aggregated in order to support wider transmission bandwidths up to 100 MHz. In CA it is possible to configure a UE to aggregate a different number of CCs originating from the same eNodeB eNB and of possibly different bandwidths in the uplink UL and downlink DL.

When in CA, a UE is always configured with a primary cell PCell. The PCell is used for security, Non Access Stratum NAS mobility, transmission of a Physical Uplink Control Channel PUCCH (including scheduling requests). All other configured CCs are called secondary cells SCells and do not have PUCCH configured. Furthermore, in CA, the possibility to de-activate CCs/SCells in order to reduce the UE power consumption is supported. The UE monitoring activity of a de-activated SCell is reduced (e.g. no PDCCH monitoring nor Channel Quality Indication CQI measurements are performed) and the UL activity in a de-activated carrier is also stopped (no Sounding Reference Signal SRS).

Moreover, since Release 8 of the 3GPP specifications (i.e. 3GPP TS 36.321), in order to assist the scheduler, the eNB can configure UEs to send Buffer Status Reports BSR and Power Headroom Reports PHR in uplink. BSR indicates the amount of data the UE has available for transmission and are typically used by the eNB to choose an appropriate transport block size while PHR are typically used to select an appropriate modulation and coding scheme MCS and number of allocated Physical Resource Blocks PRBs.

According to the above-mentioned Release 8 specification, among other conditions, in E-UTRA a BSR is triggered in the UE if data arrives in the UE buffer (at Packet Data Convergence Protocol PDCP or Radio Link Control RLC) which has higher priority than the data already available for transmission and/or if new data arrives in an empty UE buffer.

If the UE has no allocation available on the Physical Uplink Shared Channel PUSCH for the Transmission Time Interval TTI where the BSR is triggered, a Scheduling Request SR is then triggered. Once an SR is triggered, a scheduling request is either transmitted on the Physical Uplink Control Channel PUCCH using dedicated resources which are allocated on a UE basis with a certain periodicity by the eNB via RRC signaling, or if no PUCCH is available the scheduling request uses a random access procedure. An SR remains pending until new transmissions are granted to the UE or when a fixed number of scheduling requests on PUCCH have been sent.

Currently, a SR is transmitted in PUCCH, wherein PUCCH is assigned to the PCell. In recent time, it has been discussed to establish a PUCCH also on SCells to reduce the signaling burden of the PCell. Thereby, it was agreed e.g. according to 3GPP Work Item RP-142268 to specify and complete the support of PUCCH on SCell for UEs supporting uplink carrier aggregation.

However, there arises the problem of handling plural PUCCH in carrier aggregation.

SUMMARY OF THE INVENTION

Therefore, in order to overcome the drawbacks of the prior art, it is an object underlying the present invention to provide an improved utilization of carrier aggregation.

In particular, it is an object of the present invention to provide a method, apparatus and computer program product for improved handling of secondary scheduling request when having multiple PUCCH.

According to a first aspect of the present invention, there is provided a method performed by a user equipment, comprising composing a message comprising a request of radio resources for uplink transmission from the user equipment to a base station determining whether the user equipment is in a carrier aggregation mode in which two or more carriers are aggregated forming one primary cell and at least one secondary cell, the primary cell and at least one secondary cell supporting physical uplink control channel, assigning the message to a physical uplink control channel, wherein assigning is permitted to the physical uplink control channel of the primary cell and a physical uplink control channel of any of the at least one secondary cell, and transmitting the message using the assigned physical uplink control channel.

According to a second aspect of the present invention, there is provided apparatus implemented in a user equipment, comprising at least one processor, and at least one memory for storing instructions to be executed by the processor, wherein the at least one memory and the instructions are configured to, with the at least one processor, cause the apparatus at least to perform composing a message composing a message comprising a request of radio resources for uplink transmission from the user equipment to a base station determining whether the user equipment is in a carrier aggregation mode in which two or more carriers are aggregated forming one primary cell and at least one secondary cell, the primary cell and at least one secondary cell supporting physical uplink control channel, assigning the message to a physical uplink control channel, wherein assigning is permitted to the physical uplink control channel of the primary cell and a physical uplink control channel of any of the at least one secondary cell, and transmitting the message using the assigned physical uplink control channel.

According to a third aspect of the present invention, there is provided a method performed by a base station, comprising receiving a message comprising a request of radio resources for uplink transmission from a user equipment to the base station, wherein the user equipment is in a carrier aggregation mode in which two or more carriers are aggregated forming one primary cell and at least one secondary cell, the primary cell and at least one secondary cell supporting physical uplink control channel, and the received message has been transmitted using an assigned physical uplink control channel, wherein assigning is permitted to the physical uplink control channel of the primary cell and a physical uplink control channel of any of the at least one secondary cell.

According to a fourth aspect of the present invention, there is provided an apparatus implemented in a base station, comprising at least one processor, and at least one memory for storing instructions to be executed by the processor, wherein the at least one memory and the instructions are configured to, with the at least one processor, cause the apparatus at least to perform receiving a message comprising a request of radio resources for uplink transmission from a user equipment to the base station, wherein the user equipment is in a carrier aggregation mode in which two or more carriers are aggregated forming one primary cell and at least one secondary cell, the primary cell and at least one secondary cell supporting physical uplink control channel, and the received message has been transmitted using an assigned physical uplink control channel, wherein assigning is permitted to the physical uplink control channel of the primary cell and a physical uplink control channel of any of the at least one secondary cell.

According to a fifth aspect of the present invention, there is provided a computer program product comprising computer-executable components which, when the program is run, are configured to carry out the method according to the first or third aspect.

Advantageous further developments or modifications of the aforementioned exemplary aspects of the present invention are set out in the dependent claims.

According to certain embodiments of the present invention, the request comprises a scheduling request.

According to certain embodiments of the present invention, when transmission of the message is triggered, the user equipment is permitted to cause transmission on the physical uplink control channel of any secondary cell, regardless of whether the corresponding secondary cell is activated or not.

According to certain embodiments of the present invention, once the transmission on the physical uplink control channel of any secondary cell has been caused, the corresponding secondary cell is activated so that the monitoring activity is enabled to start to identify all possible grants satisfying the scheduling request.

According to certain embodiments of the present invention, when transmission of the message is triggered, the user equipment is permitted to only cause transmission on the physical uplink control channel of secondary cells that are activated.

According to certain embodiments of the present invention, when counting the number of transmitted scheduling requests, both the used physical uplink control channel of the primary cell and the used physical uplink control channel of any secondary cell are counted.

According to certain embodiments of the present invention, when counting the number of transmitted scheduling requests, the used physical uplink control channel of any secondary cell are ignored.

According to certain embodiments of the present invention, when counting both the transmissions using physical uplink control channel of the primary cell and using physical uplink control channel of any secondary cell, the maximum number of scheduling request transmission count is multiplied by the number of cells having physical uplink control channel configured.

Further, according to certain embodiments of the present invention, when only counting the transmissions using the physical uplink control channel of the primary cell, an additional timer and/or counter is configured to control the physical uplink control channel of any of the at least one secondary cell.

Further, according to certain embodiments of the present invention, when the timer and/or counter reaches the maximum or expires, transmissions using physical uplink control channel of any secondary cell are stopped, and wherein a notification to the radio resource control and starting a random access procedure is prevented.

BRIEF DESCRIPTION OF DRAWINGS

For a more complete understanding of example embodiments of the present invention, reference is now made to the following descriptions taken in connection with the accompanying drawings in which:

FIG. 4 illustrates a method according to certain embodiments of the invention, which may be carried out by a base station.

Figure 1:
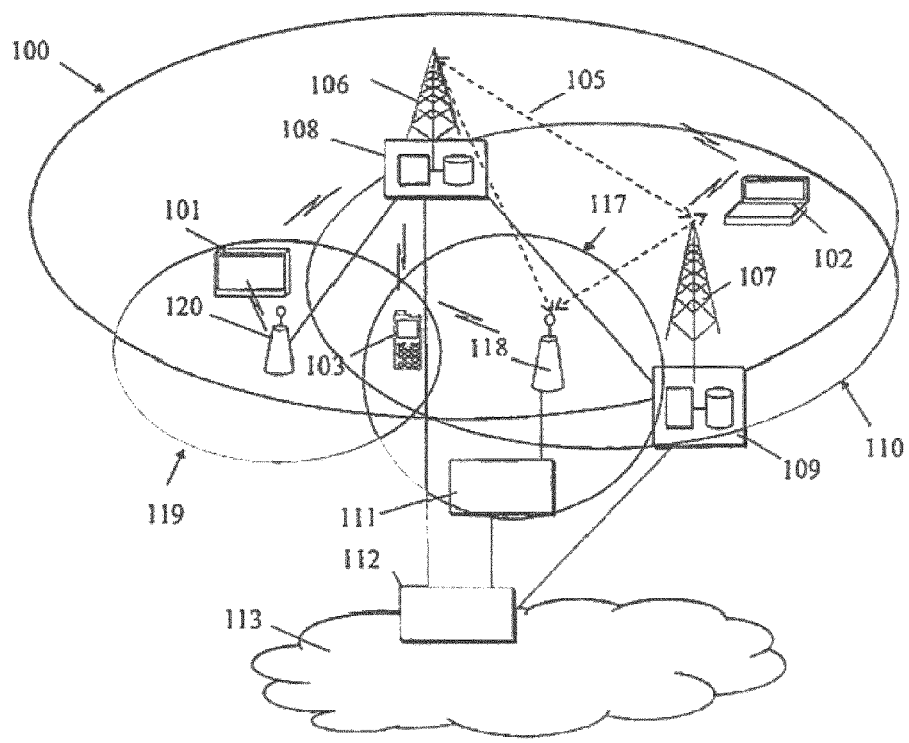
FIG. 1 illustrates a schematic diagram of a network according to certain embodiments of the invention.

DESCRIPTION OF EXEMPLARY
EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE-Advanced based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as evolved NodeB's (eNB; i.e. base station in LTE-A environment), user equipments UE (e.g. mobile phone, smart phone, Computer, etc.), controllers, interfaces, etc, and in particular any equipment used in the provision of a telecommunications service.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

As is indicated in FIG. 1, different types of communication devices 101, 102, 103 may be wirelessly connected via base stations or similar wireless transmitter and/or receiver nodes providing radio service areas or cells. In FIG. 1, different neighboring and/or overlapping radio service areas or cells 100, 110, 117 and 119 are shown, which are formed by base stations 106, 107, 118 and 120. It is to be noted that the cell borders are schematically shown for illustration purposes only, wherein it should be understood that the sizes and shapes of the cells or other radio service areas may vary considerably from the omni-directional shapes of FIG. 1. A base station site can provide one or more cells or sectors, each sector providing a cell or a subarea of a cell. Each communication device and base station may have one or more radio channels open at the same time and may send signals to and/or receive signals from more than one source.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

Different types of possible cells include those known as macro cells, pico cells and femto cells. For example, transmission/reception points or base stations can comprise wide area network nodes such as a macro eNode B eNB which may, for example, provide coverage for an entire cell or similar radio service area. A base station can also be provided by small or local radio service area network node, for example Home eNBs HeNB, pico eNodeBs pico-eNB, or femto nodes. Some applications utilize radio remote heads RRH that are connected to for example an eNB. As cells can overlap a communication device in an area can listen and transmit to more than one base station. Smaller radio service areas can be located entirely or at least partially within a larger radio service area. A communication device may thus communicate with more than one cell.

In a particular example, FIG. 1 depicts a primary cell PCell 100. In this example, the primary cell 100 can be provided by a wide area base station 106 provided by a macro-eNB. The macro-eNB 106 transmits and receives data over the entire coverage of the cell 100. A secondary cell SCell 110 in this example is a pico-cell. A secondary cell can also be provided by another suitable small area network node 118 such as Home eNBs HeNB (femto cell) or another pico eNodeBs (pico-eNB). A yet further cell 119 is shown to be provided by a remote radio head (RRH) 120 connected to the base station apparatus of cell 100.

The base stations may communicate via each other via fixed line connection and/or air interface. The logical connection between the base station nodes can be provided for example by an X2 interface. In FIG. 1, this interface is shown by the dashed line denoted by 105.

A UE that is configured for carrier aggregation connects to a Primary Serving Cell, which is known as PCell, and with one or plural Secondary Serving Cells, which are known as SCell. The PCell is defined as the cell that is initially configured during connection establishment. As already indicated above, the PCell has hitherto played a role with respect to security, non-access stratum (NAS) mobility information, system information (SI) for configured cells, and some lower layer functions.

After the initial security activation procedure, Evolved Universal Terrestrial Radio Access Network E-UTRAN may configure a UE, which supports carrier aggregation, with one or more SCells in addition to the PCell which is initially configured during connection establishment. The configured set of serving cells for a UE always contains one PCell and may also contain one or more SCells. The number of serving cells that can be configured may depend on the aggregation capability of a UE. A single Radio Resource Control RRC connection is established with the PCell, which may control all the CCs configured for a UE.

After RRC connection establishment to the PCell is performed, reconfiguration, addition and removal of SCells may be performed by RRC. In connected mode, changes of SI for a SCell are handled by release and addition of the affected SCell(s). Such release and addition may be done with a single RRC reconfiguration message.

In addition to discontinuous reception DRX operations, some kind of UE power saving may be achieved by activation and deactivation of individual SCells. Activation and deactivation of SCells may be under eNodeB control. The activation and deactivation may be executed by means of medium access control MAC control elements, which can activate or deactivate one or more SCells indicated by an 8-bitmap. A timer may also be used for automatic deactivation if no data or PDCCH messages are received on a CC/SCell for a certain period.

With multiple PUCCH, there arises the problem of handling multiple PUCCH with scheduling requests. In the following description of preferred exemplary versions of the present invention, the SR on the PUCCH of the PCell is called "PSR", while the SR on the PUCCH of an SCell is called "SSR". There is always one and only one PSR while there can be one or more additional SSR.

Generally, a SR is a special Physical Layer message for UE to ask the network to send an UL grant, so that UE can transmit PUSCH.

Figure 2:
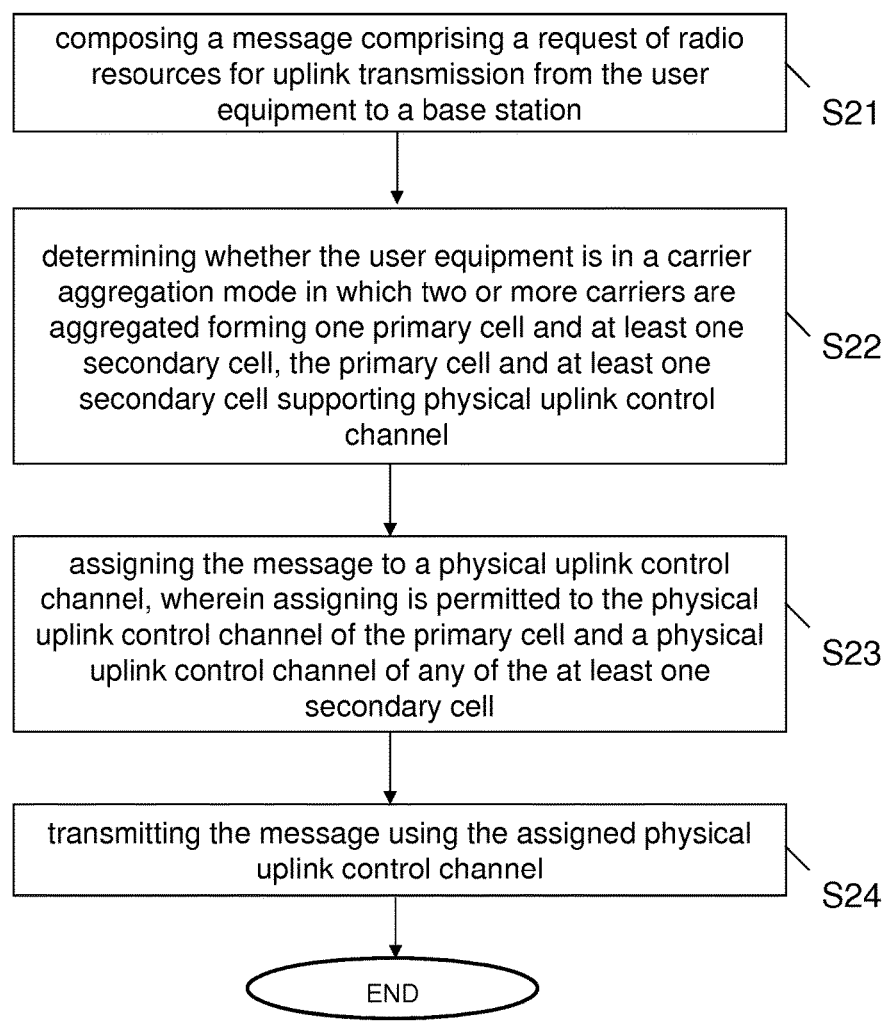
FIG. 2 illustrates a method according to certain embodiments of the invention, which may be carried out by a user equipment.

FIG. 2 shows a method according to some example versions of the disclosure, which may be performed by a user equipment e.g. under LTE-A environment.

In Step S21, a message comprising a request of radio resources for uplink transmission from the user equipment to a base station is composed.

Then, in Step S22, it is determined whether the user equipment is in a carrier aggregation mode in which two or more carriers are aggregated forming one primary cell and at least one secondary cell, the primary cell and at least one secondary cell supporting physical uplink control channel.

Further, in Step S23, the message is assigned to a physical uplink control channel, wherein assigning is permitted to the physical uplink control channel of the primary cell and a physical uplink control channel of any of the at least one secondary cell Still further, in Step S24, transmission of the message using the assigned physical uplink control channel is caused.

Figure 3:
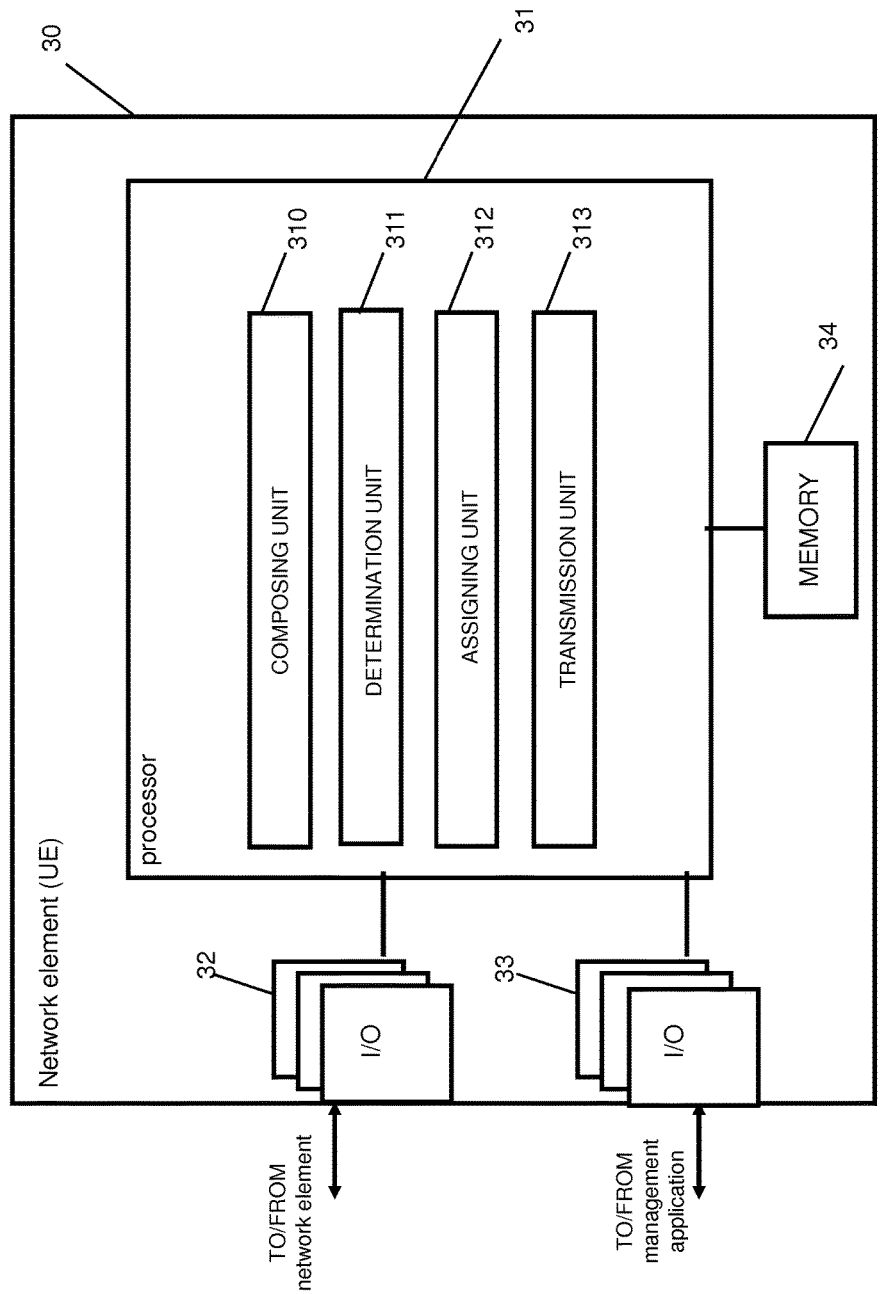
FIG. 3 depicts a general structure of an apparatus according to certain embodiments of the invention, which may be comprised in a user equipment.
Figure 5:
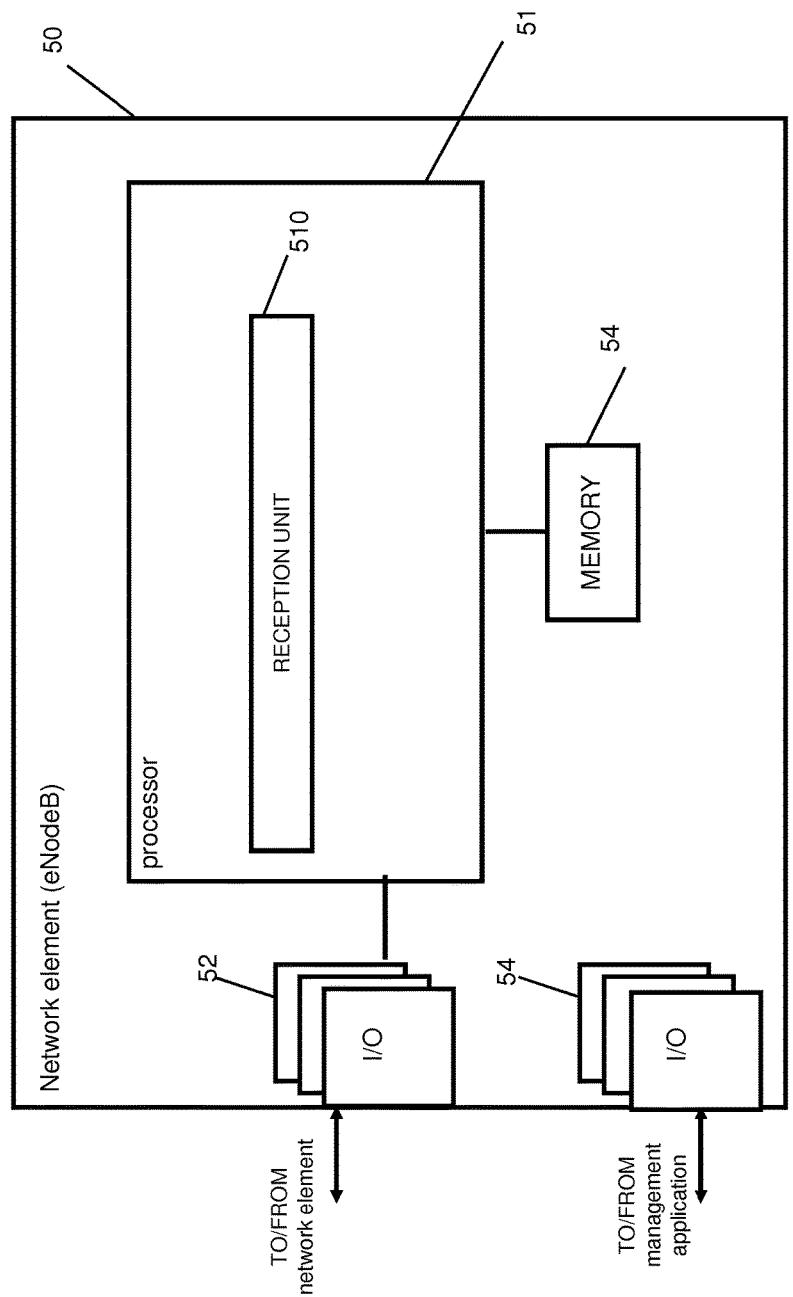
FIG. 5 depicts a general structure of an apparatus according to certain embodiments of the invention, which may be comprised in a base station.

In FIGS. 3 and 5, diagrams illustrating a configuration of an element comprised in a network element, such as a user equipment operable in LTE-A (FIG. 3) and a base station eNodeB operable in LTE-A (FIG. 5), according to some example versions of the disclosure is shown, which are configured to implement handling of secondary scheduling request in carrier aggregation described in connection with some of the example versions of the disclosure. The embodiments may be carried out in or by the network element (e.g. UE/eNodeB). It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 30, 50 shown in FIGS. 3 and 5, respectively, may comprise a processing function, control unit or processor 31, 51, such as a CPU or the like, which is suitable for executing instructions given by programs or the like related to the network element control procedure.

In FIG. 3, the processor 31 is configured to execute processing related to the above described method performed by a user equipment. In particular, the processor 31 comprises a sub-portion 310 as a composing unit configured to compile a message comprising a request of radio resources for uplink transmission from the user equipment to a base station. The portion 310 may be configured to perform processing according to S21 of FIG. 2. Furthermore, the processor 31 comprises a sub-portion 311 usable as a determination unit configured to determine whether the user equipment is in a carrier aggregation mode in which two or more carriers are aggregated forming one primary cell and at least one secondary cell, the primary cell and at least one secondary cell supporting physical uplink control channel. The portion 311 may be configured to perform processing according to S22 of FIG. 2. Furthermore, the processor 31 comprises a sub-portion 312 usable as a assigning unit configured to assign the message to a physical uplink control channel, wherein assigning is permitted to the physical uplink control channel of the primary cell and a physical uplink control channel of any of the at least one secondary cell. The portion 312 may be configured to perform processing according to S23 of FIG. 2. Still further, the processor 31 comprises a sub-portion 313 usable as a transmission unit configured to cause transmission of the message using the assigned physical uplink control channel. The portion 313 may be configured to perform processing according to S24 of FIG. 2.

Reference signs 32, 52 and 33, 53 denote transceiver or input/output (I/O) units (interfaces) connected to the processor 31, 51. The I/O units 32, 52 may be used for communicating with the network element. The I/O units 33, 53 may be used for communicating with a management application. Reference sign 34, 54 denotes a memory usable, for example, for storing data and programs to be executed by the processor 31, 51 and/or as a working storage of the processor 31, 51.

FIG. 4 shows a method according to some example versions of the disclosure, which may be performed by a base station e.g. under LTE-A environment.

In Step S41, receiving a message comprising a request of radio resources for uplink transmission from a user equipment to the base station.

Thereby, the user equipment is in a carrier aggregation mode in which two or more carriers are aggregated forming one primary cell and at least one secondary cell, the primary cell and at least one secondary cell supporting physical uplink control channel, and the received message has been transmitted using an assigned physical uplink control channel, wherein assigning is permitted to the physical uplink control channel of the primary cell and a physical uplink control channel of any of the at least one secondary cell.

In FIG. 5, the processor 51 is configured to execute processing related to the above described method. In particular, the processor 51 comprises a sub-portion 510 as a reception unit configured to receive a message comprising a request of radio resources for uplink transmission from a user equipment to the base station. The portion 510 may be configured to perform processing according to S41 of FIG. 4.

According to certain embodiments of the invention, a support for scheduling request SR message transmission in UL (PUCCH) on configured SCell is proposed. Further, UE behavior for SR in case of dual PUCCH is regulated according to some exemplary versions of the invention.

That is, according to the present invention, when an SR is triggered, both PSR and SSR can be used. Alternatively, if they overlap, only the PSR may be sent.

Further, when a SR is triggered, according to certain embodiments of the invention, the UE is enabled to send an SSR regardless of whether the corresponding SCell is activated or not.

Thereby, once an SSR is sent, the corresponding SCell may be activated, so that the monitoring activity can start to identify all possible grants satisfying the scheduling request.

Alternatively, an SSR can only be sent if the corresponding SCell already is activated.

According to some exemplary versions of the invention, when the number of sent SR is counted, both PSR and SSR may be counted. Alternatively, SSR may be ignored.

When counting both PSR and SSR, dsr-TransMax, i.e. the maximum number of SR transmission count, is multiplied by the number of cells having PUCCH configured. Alternatively dsr-TransMax is left untouched.

In contrast thereto, when only PSR are counted, an additional timer/counter may be configured to control SSR. Thereby, according to certain embodiments of the invention, when it reaches the maximum or expires, the SSR is stopped but the RRC is not notified, and thus a random access procedure is not started.

In a still further exemplary version of the present invention, the message comprising a scheduling request SR may be transmitted using a PUCCH of a SCell only.

According to the present invention, the transmission of SR on SCell(s) allows more flexibility in UL scheduling and potentially better selection of which component carrier(s) to use. In particular, the invention allows to benefit from having multiple PUCCH configured to transmit scheduling requests.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:
3GPP 3rd generation partnership project
BSR Buffer Status Report
CA Carrier Aggregation
CC Component Carrier
E-UTRA evolved UMTS Terrestrial Radio Access
LTE Long Term Evolution
MCS Modulation and Coding Scheme
PHR Power Headroom Report
PRB Physical Resource Block
PUSCH Physical Uplink Shared Channel
PUCCH Physical Uplink Control Channel
SI System Information
SR Scheduling Request
UE User Equipment

What is claimed is:

1. A method performed by a user equipment, comprising:
composing a message comprising a request of radio resources for uplink transmission from the user equipment to a base station, wherein the request comprises a scheduling request;
determining whether the user equipment is in a carrier aggregation mode in which two or more carriers are aggregated forming one primary cell and at least one secondary cell, the primary cell and at least one secondary cell supporting physical uplink control channel;
assigning the message to a physical uplink control channel, wherein assigning is permitted to the physical uplink control channel of the primary cell and a physical uplink control channel of any of the at least one secondary cell; and
transmitting the message using the assigned physical uplink control channel based on a number of scheduling request transmissions, when counting the number of transmitted scheduling requests, both the used physical uplink control channel of the primary cell and the used physical uplink control channel of any secondary cell are counted.

2. The method according to claim 1, wherein, when transmission of the message is triggered, the user equipment is permitted to cause transmission on the physical uplink control channel of any secondary cell, regardless of whether the corresponding secondary cell is activated or not.

3. The method according to claim 2, wherein, once the transmission on the physical uplink control channel of any secondary cell has been caused, the corresponding secondary cell is activated so that the monitoring activity is enabled to start to identify all possible grants satisfying the scheduling request.

4. The method according to claim 1, wherein, when transmission of the message is triggered and determined on the physical unlink control channel of the secondary cell, the user equipment is permitted to only cause transmission on the physical uplink control channel of the secondary cells that are activated.

5. The method according to claim 1, wherein, when counting both the transmissions using physical uplink control channel of the primary cell and using physical uplink control channel of any secondary cell, the maximum number of scheduling request transmission count is multiplied by the number of cells having physical uplink control channel configured.

6. The method according to claim 1, when counting the number of transmitted scheduling requests, the used physical uplink control channel of any secondary cell are ignored.

7. The method according to claim 6, wherein, when only counting the transmissions using the physical uplink control channel of the primary cell, an additional timer or counter is configured to control the physical uplink control channel of any of the at least one secondary cell.

8. The method according to claim 7, wherein, when the timer or counter reaches the maximum or expires, transmissions using physical uplink control channel of any secondary cell are stopped, and wherein a notification to the radio resource control and starting a random access procedure is prevented.

9. An apparatus implemented in a user equipment, comprising:
   at least one processor; and
   at least one memory for storing instructions to be executed by the processor, wherein
   the at least one memory and the instructions are configured to, with the at least one processor, cause the apparatus at least to perform
   composing a message comprising a request of radio resources for uplink transmission from the user equipment to a base station, wherein the request comprises a scheduling request;
   determining whether the user equipment is in a carrier aggregation mode in which two or more carriers are aggregated forming one primary cell and at least one secondary cell, the primary cell and at least one secondary cell supporting physical uplink control channel;
   assigning the message to a physical uplink control channel, wherein assigning is permitted to the physical uplink control channel of the primary cell and a physical uplink control channel of any of the at least one secondary cell; and
   transmitting the message using the assigned physical uplink control channel based on a number of scheduling request transmissions, when counting the number of transmitted scheduling requests, both the used physical uplink control channel of the primary cell and the used physical uplink control channel of any secondary cell are counted.

10. The apparatus according to claim 9, wherein, when transmission of the message is triggered, the user equipment is permitted to cause transmission on the physical uplink control channel of any secondary cell, regardless of whether the corresponding secondary cell is activated or not.

11. The apparatus according to claim 10, wherein, once the transmission on the physical uplink control channel of any secondary cell has been caused, the corresponding secondary cell is activated so that the monitoring activity is enabled to start to identify all possible grants satisfying the scheduling request.

12. The apparatus according to claim 9, wherein, when transmission of the message is triggered and determined on the physical unlink control channel of the secondary cell, the user equipment is permitted to only cause transmission on the physical uplink control channel of the secondary cells that are activated.

13. The apparatus according to claim 9, wherein, when counting both the transmissions using physical uplink control channel of the primary cell and using physical uplink control channel of any secondary cell, the maximum number of scheduling request transmission count is multiplied by the number of cells having physical uplink control channel configured.

14. The apparatus according to claim 9, when counting the number of transmitted scheduling requests, the used physical uplink control channel of any secondary cell are ignored.

15. The apparatus according to claim 14, wherein, when only counting the transmissions using the physical uplink control channel of the primary cell, an additional timer or counter is configured to control the physical uplink control channel of any of the at least one secondary cell.

16. The apparatus according to claim 15, wherein, when the timer or counter reaches the maximum or expires, transmissions using physical uplink control channel of any secondary cell are stopped, and wherein a notification to the radio resource control and starting a random access procedure is prevented.

17. A method performed by a user equipment, comprising:
   composing a message comprising a request of radio resources for uplink transmission from the user equipment to a base station, wherein the request comprises a scheduling request;
   determining whether the user equipment is in a carrier aggregation mode in which two or more carriers are aggregated forming one primary cell and at least one secondary cell, the primary cell and at least one secondary cell supporting physical uplink control channel;
   assigning the message to a physical uplink control channel, wherein assigning is permitted to the physical uplink control channel of the primary cell and a physical uplink control channel of any of the at least one secondary cell;
   transmitting the message using the assigned physical uplink control channel; and
   when counting the number of transmitted scheduling requests, both the used physical uplink control channel of the primary cell and the used physical uplink control channel of any secondary cell are counted and the maximum number of scheduling request transmission count is multiplied by the number of cells having physical uplink control channel configured.

18. A method performed by a user equipment, comprising:
   composing a message comprising a request of radio resources for uplink transmission from the user equipment to a base station, wherein the request comprises a scheduling request;
   determining whether the user equipment is in a carrier aggregation mode in which two or more carriers are aggregated forming one primary cell and at least one secondary cell, the primary cell and at least one secondary cell supporting physical uplink control channel;

assigning the message to a physical uplink control channel, wherein assigning is permitted to the physical uplink control channel of the primary cell and a physical uplink control channel of any of the at least one secondary cell;

transmitting the message using the assigned physical uplink control channel; and when counting the number of transmitted scheduling requests, the used physical uplink control channel of any secondary cell are ignored, and an additional timer or counter is configured to control the physical uplink control channel of any of the at least one secondary cell.

19. An apparatus implemented in a user equipment, comprising:

at least one processor; and at least one memory for storing instructions to be executed by the processor, wherein the at least one memory and the instructions are configured to, with the at least one processor, cause the apparatus at least to perform composing a message comprising a request of radio resources for uplink transmission from the user equipment to a base station, wherein the request comprises a scheduling request;

determining whether the user equipment is in a carrier aggregation mode in which two or more carriers are aggregated forming one primary cell and at least one secondary cell, the primary cell and at least one secondary cell supporting physical uplink control channel;

assigning the message to a physical uplink control channel, wherein assigning is permitted to the physical uplink control channel of the primary cell and a physical uplink control channel of any of the at least one secondary cell;

transmitting the message using the assigned physical uplink control channel; and when counting the number of transmitted scheduling requests, both the used physical uplink control channel of the primary cell and the used physical uplink control channel of any secondary cell are counted, and the maximum number of scheduling request transmission count is multiplied by the number of cells having physical uplink control channel configured.

20. An apparatus implemented in a user equipment, comprising:

at least one processor; and at least one memory for storing instructions to be executed by the processor, wherein the at least one memory and the instructions are configured to, with the at least one processor, cause the apparatus at least to perform composing a message comprising a request of radio resources for uplink transmission from the user equipment to a base station, wherein the request comprises a scheduling request;

determining whether the user equipment is in a carrier aggregation mode in which two or more carriers are aggregated forming one primary cell and at least one secondary cell, the primary cell and at least one secondary cell supporting physical uplink control channel;

assigning the message to a physical uplink control channel, wherein assigning is permitted to the physical uplink control channel of the primary cell and a physical uplink control channel of any of the at least one secondary cell;

transmitting the message using the assigned physical uplink control channel; and when counting the number of transmitted scheduling requests, the used physical uplink control channel of any secondary cell are ignored, an additional timer or counter is configured to control the physical uplink control channel of any of the at least one secondary cell, and wherein, when the timer or counter reaches the maximum or expires, transmissions using physical uplink control channel of any secondary cell are stopped, and wherein a notification to the radio resource control and starting a random access procedure is prevented.

* * * * *